Patented Aug. 29, 1944

2,357,072

UNITED STATES PATENT OFFICE 2,357,072

ELECTRICAL INSULATING COMPOSITIONS

Bjorn O. Beck, Newark, Ohio, Hubert L. Beck, Western Springs, Ill., and Cecil H. Gunthorp, Indianapolis, Ind.

No Drawing. Application July 31, 1940, Serial No. 348,822

1 Claim. (Cl. 201—64)

This invention relates to compositions to be employed for electrically insulating electric resistance wires carried in conjunction with a metallic support and cooking surface. The invention contemplates the forming of the composition into a liquid or plastic state so that it may be poured directly into place without requiring molding or pressing operations.

A further important advantage of the composition constituting the invention is that the composition has excellent electrical insulating properties at high temperatures as well as low and at the same time has a high degree of thermal conductivity. Furthermore the composition has little chemical action on metallic resistance wires and other metallic surfaces with which the composition may be brought into contact. Further, the materials employed in forming the composition are relatively cheap and readily available in a very pure condition, a high degree of purity of the ingredients being required to give the best results in the composition.

One particular and desirable form of the invention consists in moistening fused magnesium oxide with a water solution of ammonium dihydrogen orthophosphate to give the desired degree of flow and the mixture thus formed is poured into the desired resistance wire holder to surround the resistance wire. Then the mixture, hereinafter termed "cement," is dried and heated in place to a temperature sufficiently high to drive off all of the ammonia, moisture, and other readily volatile matter, leaving only the grains of magnesium oxide cemented together with magnesium phosphate or phosphates.

The fused form of magnesium oxide is required on account of the fact that when fused the oxide is quite dense and non-porous, and thereby reacts more slowly and effects a better bond than will the non-fused oxide which reacts substantially immediately to form principally magnesium phosphate but giving very slight bonding.

In place of the fused magnesium oxide, fused zirconium oxide may be used in place of part or all of the fused magnesium oxide. The fused zirconium oxide gives good electrical insulation with high thermal conductivity, but at the present time it is relatively higher in cost and more difficult to obtain in satisfactory grain sizes. Fused aluminum oxide probably has better heat conductivity than either the fused magnesium or fused zirconium oxide, but its electrical insulating properties are not quite so good. In any event a fused refractory seems to be necessary to give the desired heat conductivity and also, particularly with the use of magnesium oxide, to give the high degree of bonding action with the phosphate. Of course, it is possible to use with the fused refractory material diluents such as clay, talc, sillimanite, titanium dioxide, and magnesium, zirconium and aluminum oxides in the fused condition, and in fact almost any other refractory material that does not conduct electricity. It is to be noted, however, that the diluents are employed merely to reduce cost of the cement since it is preferable to use the fused oxides above indicated without dilution with other refractories.

Straight phosphoric acid may be employed but it gives an excessive action on the resistance wires and the iron surface plate which is to be avoided. It is, therefore, preferable to use some compound that will decrease the violence of action resulting from straight phosphoric acid, such as the ammonium dihydrogen orthophosphate above indicated. Other acid ammonium phosphates may be used, such as diammonium hydrogen pyrophosphate; ammonium dihydrogen pyrophosphate; diammonium hydrogen metaphosphate; ammonium hydrogen metaphosphate; and diammonium hydrogen orthophosphate.

We claim:

The method of making an electrical resistance element heating unit which comprises those steps of mixing an ammonium phosphate salt in water; mixing an amount of the water-phosphate salt mixture with fused magnesium oxide to a consistency permitting the mass to be poured; pouring the mass into a metallic resistance wire holder to flow the mass around the resistance wire; and drying the mass so formed.

BJORN O. BECK.
HUBERT L. BECK.
CECIL H. GUNTHORP.